(12) United States Patent
Morse

(10) Patent No.: US 8,959,437 B2
(45) Date of Patent: Feb. 17, 2015

(54) SYSTEM AND METHOD FOR PERSONALIZING THE USER INTERFACE OF AUDIO RENDERING DEVICES

(75) Inventor: Lee Morse, Sunnyvale, CA (US)

(73) Assignee: Creative Technology Ltd, Singapore (SG)

( * ) Notice: Subject to any disclaimer, the term of this patent is extended or adjusted under 35 U.S.C. 154(b) by 449 days.

(21) Appl. No.: 12/905,487

(22) Filed: Oct. 15, 2010

(65) Prior Publication Data

US 2011/0029637 A1 Feb. 3, 2011

Related U.S. Application Data

(63) Continuation of application No. 11/779,256, filed on Jul. 17, 2007, now abandoned.

(60) Provisional application No. 60/807,711, filed on Jul. 18, 2006.

(51) Int. Cl.
*G06F 3/16* (2006.01)
*G11B 27/34* (2006.01)
*G11B 27/10* (2006.01)
*G06Q 30/02* (2012.01)
*G06F 17/30* (2006.01)

(52) U.S. Cl.
CPC ............... *G11B 27/34* (2013.01); *G06F 3/167* (2013.01); *G06Q 30/0255* (2013.01); *G06F 17/30053* (2013.01); *G06F 3/16* (2013.01); *G06F 17/30017* (2013.01); *G06F 17/30775* (2013.01); *G06F 17/30772* (2013.01); *G11B 27/105* (2013.01); *Y10S 715/978* (2013.01)
USPC ........... 715/727; 715/716; 715/736; 715/864; 715/866; 715/978; 369/30.08

(58) Field of Classification Search
CPC ..... G06F 3/16; G06F 3/167; G06F 17/30017; G06F 17/30053; G06F 17/30775; G06F 17/30772; G06Q 30/0255
USPC ................ 715/727, 716, 736, 864, 866, 978; 369/30.08
See application file for complete search history.

(56) References Cited

U.S. PATENT DOCUMENTS

| | | | |
|---|---|---|---|
| 2002/0188449 A1* | 12/2002 | Nukaga et al. | 704/258 |
| 2003/0023684 A1* | 1/2003 | Brown et al. | 709/204 |
| 2005/0108015 A1* | 5/2005 | Agapi et al. | 704/270.1 |
| 2006/0123975 A1* | 6/2006 | Swanson | 84/600 |
| 2009/0088877 A1* | 4/2009 | Terauchi et al. | 700/94 |
| 2010/0115452 A1* | 5/2010 | Chabot et al. | 715/779 |
| 2010/0255890 A1* | 10/2010 | Mikkelsen et al. | 455/567 |

* cited by examiner

*Primary Examiner* — Ting Lee
(74) *Attorney, Agent, or Firm* — Russell Swerdon; Desmund Gean

(57) ABSTRACT

Audio playback is used to enhance the control of Personal Digital Entertainment devices. Embodiments of the present invention provide audio message files associated with the activation of a control or provide other device status messaging Audio messages are also provided in file sets that are user selectable to give the user a choice of 'themes'.

17 Claims, 11 Drawing Sheets

| User Interface Function | Candidate Audio Messages |
|---|---|
| POWER ON | "Hello" |
| | "Welcome Back" |
| | "Greetings" |
| | "Hi!" |
| | "Starting Up" |
| | "Welcome back, I had a good rest" |
| VOLUME UP | "Turning it up!" |
| | "To the Max!" |
| POWER DOWN | "Catch you on the flip-side" |
| | "Wake me when you want some more entertainment" |
| | "See you later" |
| | "Sleeping now" |
| | "I think I'll catch a few Z's" |
| BATTERY LOW (>60%) | "We have plenty of juice, so lets get started where you left off!" |
| 60% | "You have about six hours left before a charge is needed" |
| | "We have a little over five hours of juice, so lets boogie" |
| | "The battery is getting a little weak. I'll let you know when we have to think about recharging it" |
| 30% | "Getting a little shy on power. Only 90 minutes left" |
| | "Yo dude (Dudet), the juice is getting low. You might think about finding a plug" |
| 15% | "I don't know about you, but I'm starved. Plug me in, or its lights out for me" |
| | "I'm afraid that the battery has less than 15 minutes left. Time to plug me in." |
| 0% | "Shutting down Now!" |
| | "See you after I recharge" |
| | "Dude, I'm out of here. See you on the flip-side" |

*FIG. 1*

| User Interface Function | Candidate Audio Messages |
|---|---|
| PLAYER STATUS | "I've refreshed your audio selections. Hope you enjoy the new stuff" |
| | "It's Tuesday and you know what that means...Hot release party time!" |
| | "You have a number of new offers. Do you want to review them?" |
| | "I have added a number of new selections, during my sleep" |
| | "Now we seem to be rocking!" |
| CHANGING STATIONS | "Here are your favorite (morning/afternoon/evening/midnight) stations" |
| | "I've got your (weekday/weekend/workday) (morning/afternoon/evening/midnight) stations all queued up." |
| | "Shall I pick one for you?" |
| | "Are you up for something different?" |
| | "You seem to be skipping around a lot. Want to try something new?" |
| | "Seems like we have a winner! I will add it to your favorite stations list" |
| | "Shall I recommend something for you?" |
| | "You don't seem very pleased by this selection. Lets try something else" |
| | "Here! Try this." |
| | "Going to something new" |
| ALBUM INTRO & THANKS | "Thanks for listening to my new release. I hope you enjoy it" |
| | "Thanks for hanging with me. I laid this out for you" |
| | "I dedicated this song to my new child" |
| | "I wrote this while sitting on the beach. Enjoy!" |
| SKIP TRACK | "I'm with you" |
| | "Skipping to next song" |
| | "OK. Skipping ahead" |
| | "I'm on it!" |
| | "Oops, going to the next song" |
| | "I like your thinking" |

*FIG. 2*

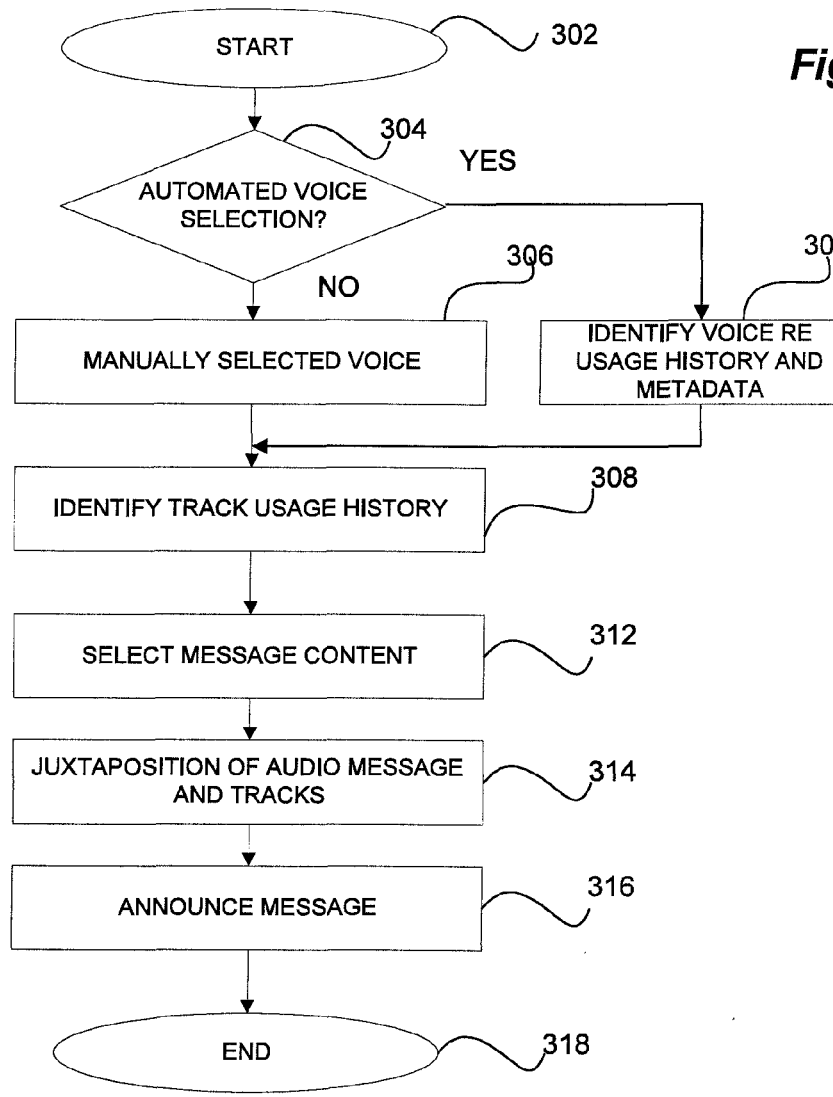
Fig._3

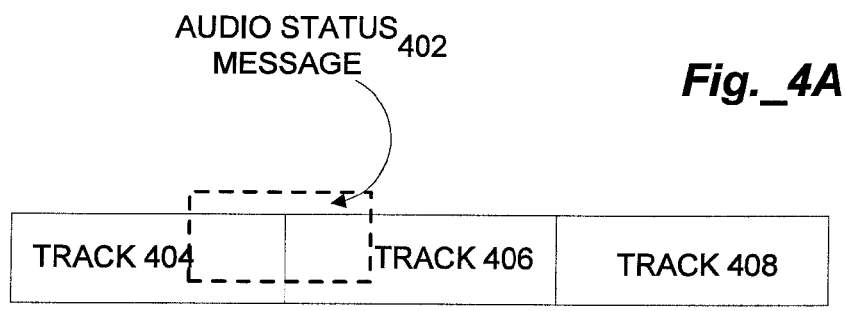
*Fig._4A*
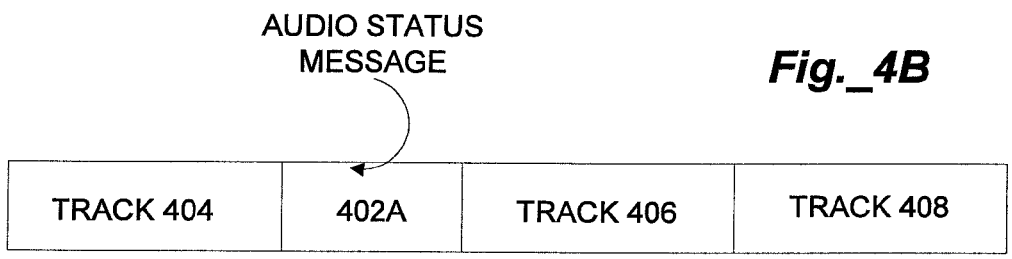
*Fig._4B*

SYSTEM AND METHOD FOR PERSONALIZING THE USER INTERFACE OF AUDIO RENDERING DEVICES

BACKGROUND OF THE INVENTION

1. Field of the Invention

The present invention relates to audio products. More particularly, the present invention relates to methods for personalizing the user interfaces of audio players.

2. Description of the Related Art

With the advancements in audio technology, increased memory storage, and increased computer processing power, much attention has been focused on improving the interactions between the user and the media player to provide a more comfortable experience for the user. Unfortunately, many current devices require the user's attention to the display screen of the audio player device to ascertain the status of the device. In some cases, the status messages are displayed in small text or graphics that make it difficult for the user to follow. Moreover, the messages are often presented in a bland manner that fails to capture the style that a user wishes to associate with the media player. Accordingly, it is therefore desirable to provide an improved device and method for personalizing the user interface of audio computing devices.

SUMMARY OF THE INVENTION

The present invention provides an apparatus and method for providing personalized user interfaces on audio computing devices.

In one embodiment, a device is configured to announce status messages and input button interactions on the audio output unit of the device.

In another embodiment, the device is customizable to a predetermined theme for the device. The device is configured to generate audio status messages, button interaction messages, and non-device operational messages associated with the predetermined theme and to play back the respective messages through the device's audio output circuitry. These and other features and advantages of the present invention are described below with reference to the drawings.

BRIEF DESCRIPTION OF THE DRAWINGS

FIG. 1 is a table illustrating generated audio messages in accordance with one embodiment of the present invention.

FIG. 2 is a table illustrating generated audio messages in accordance with one embodiment of the present invention.

FIG. 3 illustrates a method for generating customized audio messages in accordance with one embodiment of the present invention.

FIG. 4 illustrates alternative methods for positioning audio messages in accordance with embodiments of the present invention.

DETAILED DESCRIPTION OF PREFERRED EMBODIMENTS

Figure 5A:
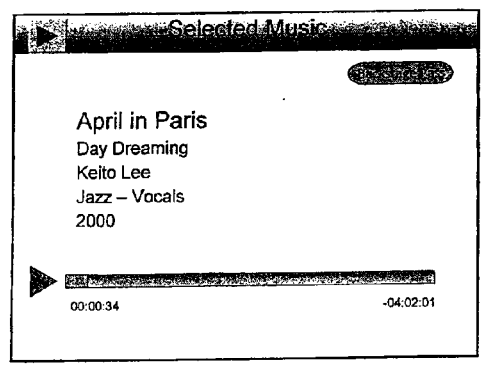
FIGS. 5A-5Z and 5AA-5MM show a sequence of display screens illustrating a media object file in accordance with one embodiment of the present invention and navigation to the links comprising the media object file.
Figure 5B:
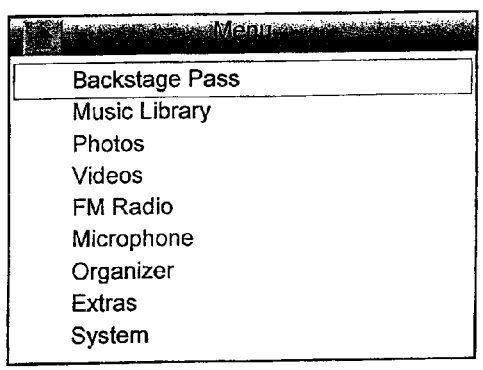
Figure 5C:
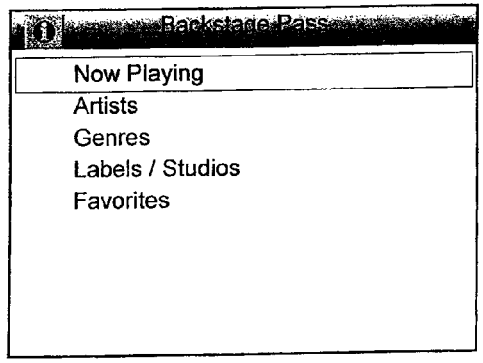
Figure 5D:
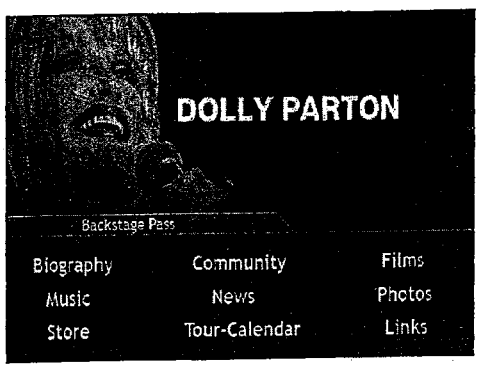
Figure 5E:
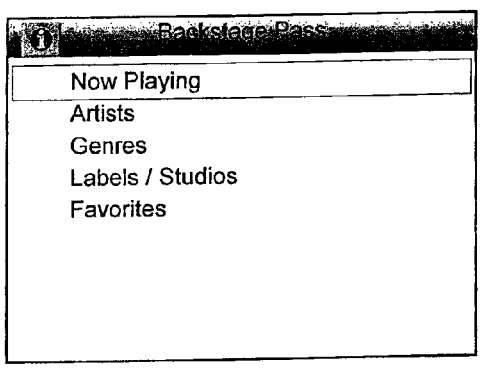
Figure 5F:
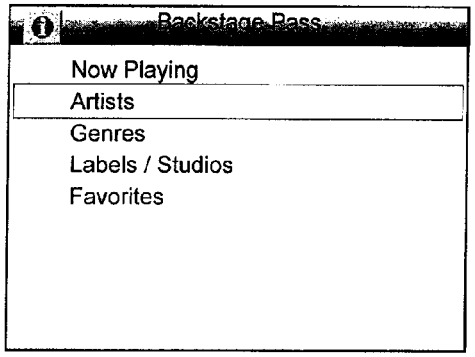
Figure 5G:
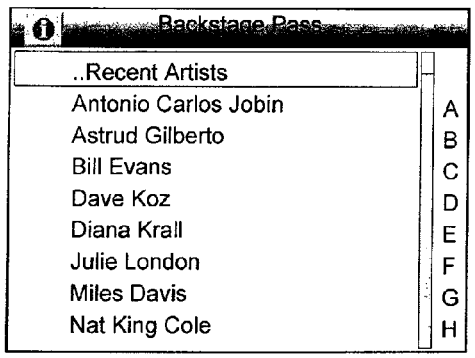
Figure 5H:
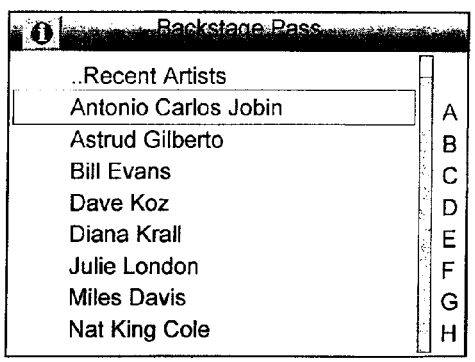
Figure 5I:
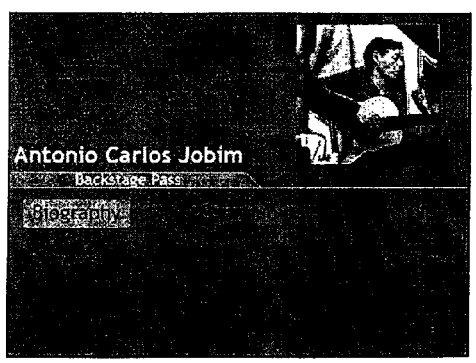
Figure 5J:
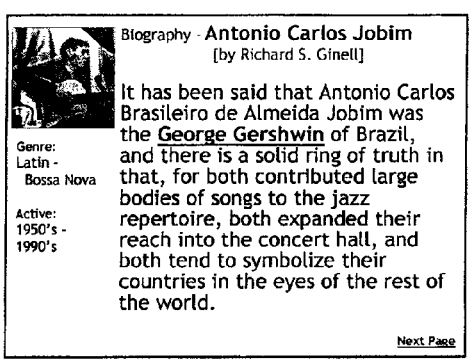
Figure 5K:
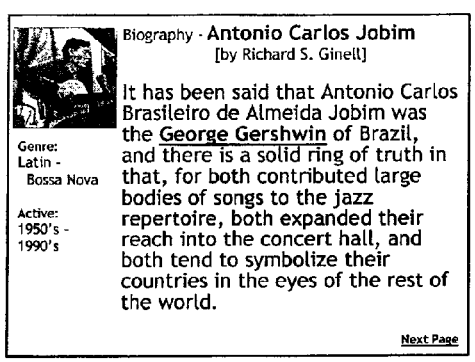
Figure 5L:
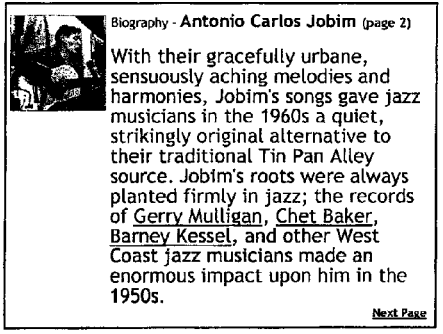
Figure 5M:
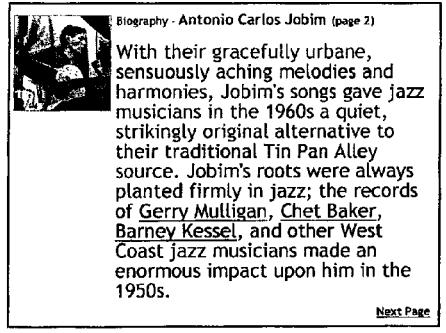
Figure 5N:
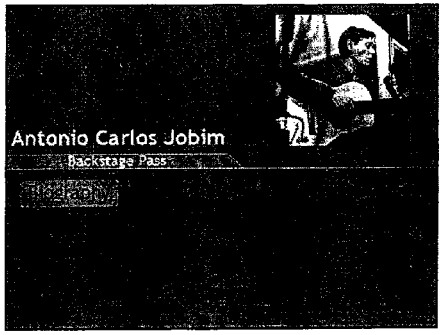
Figure 5O:
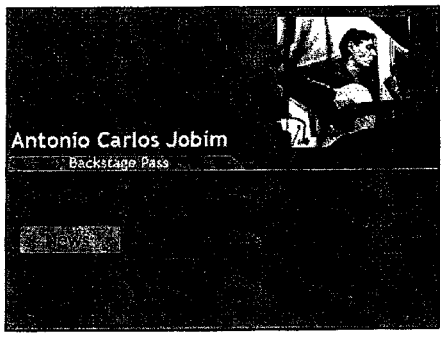
Figure 5P:
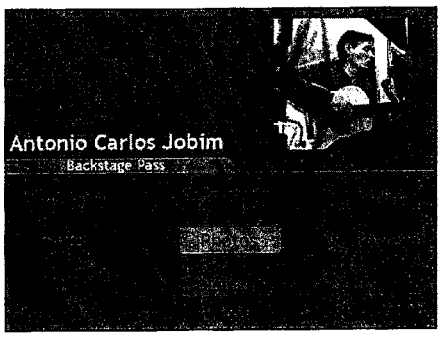
Figure 5Q:
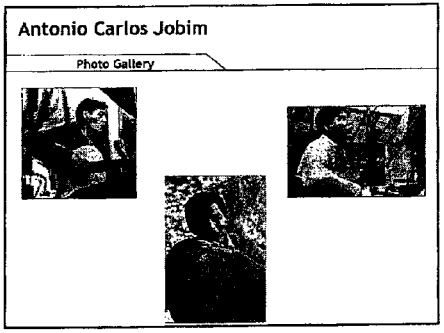
Figure 5R:
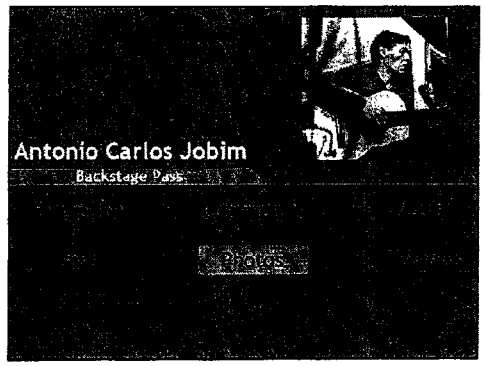
Figure 5S:
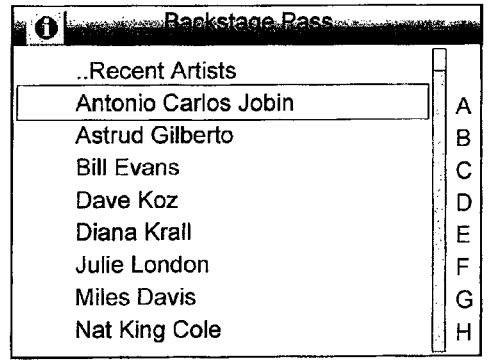
Figure 5T:
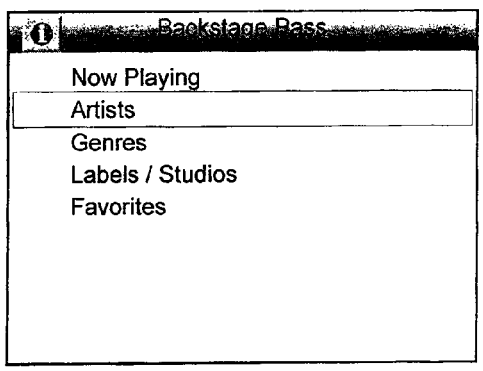
Figure 5U:
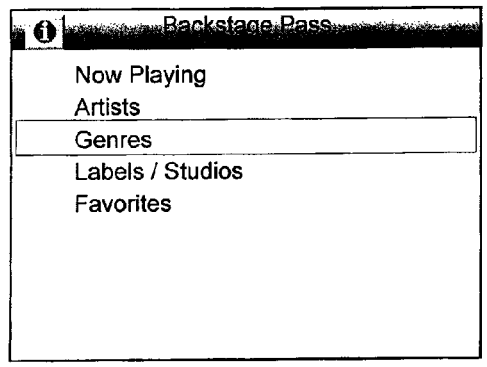
Figure 5V:
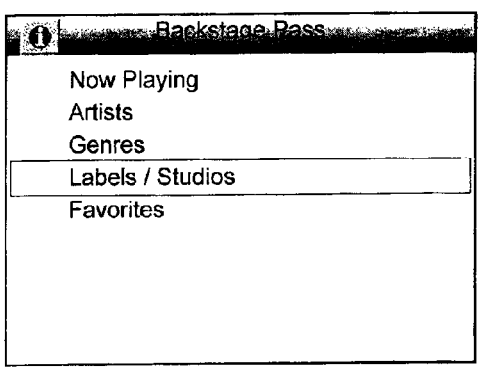
Figure 5W:
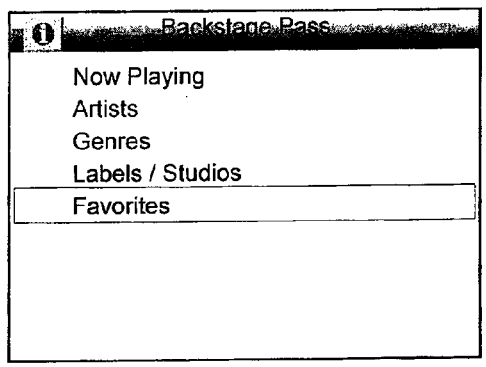
Figure 5X:
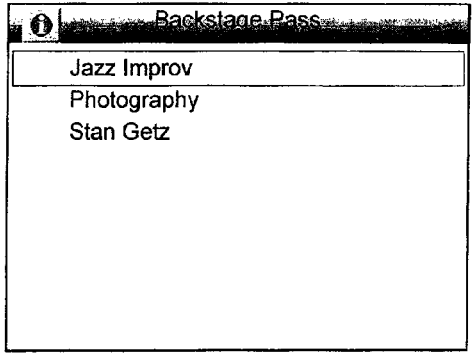
Figure 5Y:
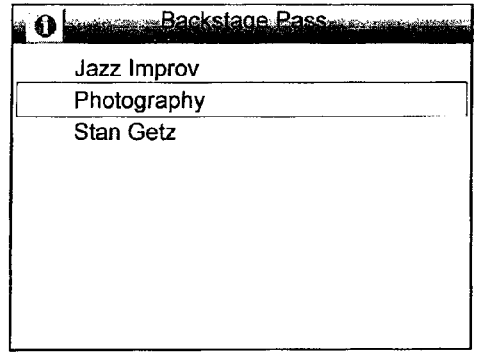

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known mechanisms have not been described in detail in order not to unnecessarily obscure the present invention.

It should be noted herein that throughout the various drawings like numerals refer to like parts. The various drawings illustrated and described herein are used to illustrate various features of the invention. To the extent that a particular feature is illustrated in one drawing and not another, except where otherwise indicated or where the structure inherently prohibits its incorporation of the feature, it is to be understood that those features may be adapted to be included in the embodiments represented in the other figures, as if they were fully illustrated in those figures. Unless otherwise indicated, the drawings are not necessarily to scale. Any dimensions provided on the drawings are not intended to be limiting as to the scope of the invention but merely illustrative.

In accordance with one embodiment, a device that includes enhanced audio messages is provided. The device is customizable to a predetermined theme for the device. The device is configured to generate audio status messages, button interaction messages, and non-device operational messages associated with the predetermined theme and to play back the respective messages through the device's audio output circuitry.

The scope of the present invention includes but is not limited to the rendering of audio messages on portable media players as well as media players configured to render audio on Personal Computers (PC's). That is, the scope of the present invention includes at least any digital device that includes a speaker to interact with the user. The devices can range from portable devices to PC applications to Consumer devices. Preferably, the user can select a customized audio message for various button interactions and status messages. Specific user interface selection options may be provided in software run on the host computer (e.g., a PC) or in firmware operating in a portable media player or other consumer electronic device.

FIGS. 1-2 are tables illustrating generated audio messages in accordance with one embodiment of the present invention. For example, FIG. 1 is a table illustrating in general audio messages that may be substituted for conventional player status buttons. In conventional devices, the user interface function advising the user that the device is powering up often is limited to a graphical display or splash screen or a text message appearing on the display screen of the portable device. Suitable candidates for the audio message according to embodiments of the present invention include audio messages such as "Hello"; "Greetings"; "Welcome Back"; etc as listed in FIG. 1.

In another example, conventional players will often provide a graphical representation of the battery condition, the amount of charge in the battery depicted by the fill in an icon resembling an outline of a battery. Embodiments of the present invention either augment this display or replace the displayed message with a suitable message as illustrated in FIG. 1. That is, when the device is turned on, the device may be configured to announce (audibly) to the user that the battery charge level exceeds a predetermined threshold, for example, by indicating, "we have plenty of juice, so let's get started where you left off!" Alternatively, when the state of charge reaches a danger level, i.e., dangerously low for continued operation, a suitable message may be generated, for example, "Plug me in or its lights out for me." These examples are merely illustrative and are not intended to be limiting. Other examples of suitable audio messages for various levels of battery condition are recited in FIG. 1. Other button interaction conditions may be announced including advising of volume adjustments made by the user (e.g., "volume up"), skipping tracks, and powering down the device. In one embodiment, conventional text strings are associated with the audio messages and displayed simultaneously on the audio player's display screen.

FIG. 2 provides additional examples of audio messages that may be displayed on the device in accordance with embodiments of the present invention. These messages illustrate types of status messages that can be generated and are not necessarily tied to a device button interaction. For example, some advanced portable media players perform advanced track selection techniques including but not limited to the automatic generation of playlists. These playlists generation techniques may be entirely automatic based on the user's playback history of tracks or may in whole or in part be based on parameters manually entered by the user. Examples of the former include the generating or updating of a playlist based on the user's activities in allowing a track to play to completion or alternatively pressing skip track during the play back of the track. In this method, the user activity in allowing a track to play to completion is deemed a positive vote and skipping the track is deemed a negative vote. The playlist composition is dynamically changed according to the user rating defined by the accumulation of votes or other indications of user approval/disapproval. The audio status messages, such as illustrated in FIG. 2 are especially conducive to providing "intelligent" status messages to the user under these conditions. For example, the user may skip several songs queued up in a playlist, an activity that would in one embodiment trigger an intelligent selection mechanism in the device to offer a track with different metadata characteristics than the rejected (i.e., skipped) tracks. The device would then audibly respond with a suitable message to advise the user of its intervention, a message such as, "Here. Try this!" Alternatively, the device might respond to a sequence of user rejections (e.g., skipping tracks) by providing a randomly selected track with the same message provided. The various messages illustrated in FIG. 2 to audibly describe the player status or changing stations status are other examples of suitable messages for generation by the device's audio units.

As discussed above, the device may also be configured to provide non-operational messages, for example the message listen in FIG. 2 as corresponding to the user interface function of "Thanks" or "Album Introduction". For example, audio messages delivered by the artist may be stored in files and triggered to play at the start of the track playback or after completion of playback. For example, a new release from a particular artist may result in the playback of the artist graciously thanking the user, "Thanks for listening to my new release. I hope you enjoy it."

In another embodiment, entire sets of audio files associated with the various messages are generated and stored. When configuring the audio player, the user selects from a plurality of themes corresponding to the sets of stored audio files. For example, themes can vary widely such as a theme where the messages represent a very formal butler (with a British accent) or a Rap star with the latest slang or even one's own voice with messages that mean something to themselves.

In this way, the user is provided with an ability to personalize the UI to a specific theme. In one variation, the user is provided with an option to generate arbitrary audio message recordings of the user or other humans. For example, the user or a friend may record the audio messages (such as via a host computer's sound card) and then associate the recorded set of messages with corresponding user interaction buttons and status messages. Preferably, the software running on the host computer provides an interactive step-by-step procedure that enables the user to make an audio recording and then to determine the one or more status messages or button interactive messages that can be associated with the generated audio recording. In one embodiment, a method enabling user selection is available from a setup option on the user interface of the portable device or alternatively from a software music library synchronizing application running on a host computer (PC).

In one embodiment, a customized (personalized) audio user interface is provided. The functionality and the audio rendering of at least one of audio button interaction messages, status messages, and non operational audio messages are customized. According to this embodiment, an audio user interface is selected by the user from a plurality of available audio user interface templates (or skins). The scope of the invention is intended to cover all means capable of associating customized audio rendering messages with a user in his interaction with an audio player. In a preferred embodiment, a file is associated with this customized audio user interface to define the various elements of the audio messages provided to the user during the course of the operation of the portable media player. In this way an audio skin or template is provided and stored with a file. Hence, that same template is accessible to that user in future sessions. Alternatively, the audio message rendering options may be selected interactively by the user at the start of each session. Of course, the viability of customizing the audio message 'skins" at the start of each session will depend in part upon the number of different options presented to the user for selection and the impulsive nature of the particular user.

FIG. 3 illustrates a method for generating customized audio messages in accordance with one embodiment of the present invention. Customization can include any one or combination of the following elements: the voice used to render the audio message, the personality of the announcing voice, the content of the message, the language used to express the content, the manner in which the content is generated, and the timing of the presentation of the audio message with other audio content. These generally relate to the style of the voice message and the content of the message. Operations 304-306 relate generally to the style and operations 308-312 to the message content.

It should be noted that the user can express his preferences as to generally the styles of the audio message and the message content through a setup option on a portable media player, an application software program running on a host computer (PC) typically used for providing downloaded music to the portable device, or on both of them.

The method starts at operation 302. Initially, at operation 304, a determination is made as to whether the user manually selected a voice style (i.e., user personalized theme for audio messages) or whether the automated voice style selection applies. Where the manual selection was made, at operation 306, the user selected voice to be used is identified and preferably other audio message characteristics determined. For example, the other features of the selected style may include an accompanying energy level or personality. In a particular example, the voice options can include male or female, computer generated or recorded human voices, American accents, British accents, Indian accents, etc. Some of the voices may be associated with different personality characteristics. For example, a user may select a high energy level personality characteristic voice for use with fast paced rock music. In other instances a user may show a preference for classical music and opt to have the media player render audio announcements in a laid back or mellow classical host type voice. For example, using one selection, the media player may inform the user in a style approaching that of a classical music host, upon powering up, "Sir! It's a pleasure to welcome you back". Using a different selection, upon powering up, the user might be greeted with an alternative message, such as, "We're cooking now Dude."

In the automated selection variation, illustrated in operation 305, the user may opt for a computer selection mode that allows the processor to make an intelligent selection of the audio messages based on usage history or metadata for audio tracks. For example, the processor may be configured to identify the genre of a track or series of tracks and play back the audio messages in voices and/or personalities associated with those genres. The voice style may also or alternatively be selected based on the usage history (track playback history) of the user. For a further example, if the usage history showed a majority of fast paced tracks in the tracks selected and played by the user, the voice selection would be one appropriate for this pace, e.g., a fast talking, energetic, and loud voice. In yet another variation, a set of suitable audio messages may be obtained from an artist, for example by downloading. In another example, the artist or other celebrity's audio message files may be packaged in the same medium as the artist's CD music recording or DVD video. These examples are intended to be illustrative and not limiting. In this instance, the player may be configured to announce messages in the voice of the artist whose track or tracks are currently playing. These artist provided messages may be in the form of informational messages, for example, the artist talking about how he came to compose the current song or status massages about the player. Another example of the former would be the artist commenting, "Thanks for listening to my new release," or any other track related messages from the artist including but not limited to those illustrated in FIG. 2. For a specific non-limiting example of an artist provided status message, during or immediately after playback of one of Bruce Springsteen's tracks, an audio message may appear in Bruce Springsteen's voice that the player is low in power and will shut down in a few minutes.

Next, in operation 308 the relevant track usage history is determined. For example, if the usage history, stored for example in metadata associated with the tracks, indicates that the user has skipped the track the last few times it has come up on a playlist, the player might respond with an appropriate audio message, "I was expecting you to skip it." The next time it is skipped, it might provide an audio message to the effect, "Let's try something entirely different." In this way the player gives the perception that it is an intelligent device because it doesn't provide the same message twice. The selection of the message content in operation 312 is preferably then a function of the track usage history 308 or other metadata relating to the track including more traditional metadata such as artist name, album name, genre type, etc.

In operation 312 the juxtaposition of the audio message and tracks is determined. Nonlimiting examples of the juxtaposition are provided in FIG. 4.

FIG. 4 illustrates alternative methods for positioning audio messages in accordance with embodiments of the present invention. FIG. 4A illustrates one audio message positioning technique according to embodiments of the present invention. The audio status 402 may be voiced over the track or tracks (e.g., tracks 404 and 406). Techniques for performing this voice over are known to those of skill in the relevant arts and hence complete details will not be provided herein. For example, the audio levels of the track 404 and track 405 at the time of the voice over as well as the audio level of the associated audio status message 404 may be adjusted to allow both to be heard. The audio levels of the message can be varied in accordance with the priority or importance of the status message. An alternative audio status message presentation or juxtaposition may be provided as illustrated in FIG. 4B. In this embodiment, the audio status message 402A is provided after completion of the rendering of track 404 completes its playback and before track 406 commences playback Finally in operation 316 the message is announced. The method ends at operation 318, ready to be initiated upon the occurrence of a suitable triggering event, such as a button interaction, an indication for a status message, or an indication of an informational type message.

In yet another embodiment, non-device operational audio messages are included in the audio message set and played back based on how the device is being used. These messages might be a "Thank You" message from an artist that is played when the user selected and listened to his latest release.

Various embodiments of the present invention provide a method to allow the user to personalize their products with audio clips. This opens up a new type of media content that has value to the artists and labels, for at least promotional purposes.

Embodiments of the present invention not only allow the device to controlled without looking at a visual display, but also allows the entire operation of the device to be personalized around a theme. Further, in one embodiment, the interactive application allows the user to change the audio messages to reflect their personality.

In one embodiment, the audio messages are integrated with smart playlisting features. Smart playlisting refers to the generation of intelligent playlists by the device, software running on a host computer, or a combination of these. The smart playlisting method integrates the user's playback history and in some cases user selected parameters to generate a new playlist. The playlist may automatically update itself over time. The audio messages may include status announcements that apprise the user as to the activities undertaken by the smart playlisting feature. For example, FIG. 2 includes several examples of the smart playlisting announcements. For a specific non-limiting example, after updating a playlist, the media player device may announce, "I've added a number of new selections during my sleep."

This method allows selected additional 'rich' audio content to be included in the listening experience. Non-limiting examples include playing a personal 'Thank You' message from an artist, after the listener has listened to his latest release.

Audio playback is used to enhance the control of Personal Digital Entertainment devices. Embodiments of the present invention provide audio message files associated with the activation of a control or provide other device status messaging ("low battery", etc.). Audio messages are also provided in file sets that are user selectable to give the user a choice of 'themes'. In a further embodiment, the enhanced content is extended to allow for 'pre-recorded' additional media files to be played under different operating conditions.

Provided also is a method for personalizing the user interface audio. Conventional electronic devices offer controls and a menu system for user interactions. The present invention gives the user the ability to personalize the content of the interaction with the device, information or content that is normally fixed by the manufacturer.

The user can purchase or download the personalized set of audio messages or other content. While preferably, the content is audio, the scope of the invention is intended to include other content, including but not limited to video, backgrounds, images, and text. For example, an artist's web site may offer a personalization tailored for the specified electronic device. For example, the user can go to a web site associated with an artist (e.g., Bruce Springsteen) and select an interaction package from available packages (e.g., one tailored for the Zen vision M). More preferably, the personalization is of a universal type suitable for playback on a wide variety of different electronic devices and computers. Users are already familiar with "localizing" a device by selecting a language option from a main menu. Hence, they would be expected to adapt easily to selecting the customization or personalization options described herein.

The "personalization" gives the user the ability to customize the feedback from the device, and can include also video and background. One problem with static interactive responses, even if customized by the user, is that they may become annoying if frequently repeated. In a further embodiment, the responses selected for the device are not static but are dynamic. That is, sometimes a response is given; sometimes no response, or a different response is given for an activity. The dynamic responses preferably adapt to the usage model of the user. Alternatively, in one embodiment, the audio message generation is controlled by a suitable control, such as a slider, in combination with the user interaction history. A slider is a control within a graphical user interface in which an indicator can be moved along a continuous path into a number of different positions. In this instance, the slider control can be used to adjust to the user's vocalization preferences. For example, some people have chatty personalities and thrive on voice messages. In this case, they would prefer the slider to be positioned towards a "chatty" end whereas others would prefer the amount of voice or other audio message interruptions to be minimized. In the latter case, the slider would be positioned at the opposite end of the spectrum.

Provided in one embodiment is a device that includes a selection mechanism and a customized presentation layer. The presentation layer can be configured to convey to the user that it is an intelligent machine, capable of making decisions independent from the user. The device intelligently provides an audio message as a combination of the user's control and the user history. In some cases, randomness is used to determine whether a particular message is rendered or which message from a plurality of suitable audio message options is rendered. That is, the device may be configured to provide an appropriate response from a plurality of available responses based on a combination of the user's control and the user history, randomness, or all of these.

In accordance with yet another embodiment, a container providing rich content is provided. This concept is focused on creating a method of tying together different media files into a 'richer' browsing experience. Today, you can load a set of audio files, photos and even videos onto a device, but the user interface treats them all as different items. You must manually search in different areas of the library to view the files. This method, in one embodiment, packages the set of different media files in a way that the user is able to browse a gallery of photos related to the music track being listened to. It gives the user access to text based background information (biography, news, lyrics, etc.) and even links to videos on the player.

Using a simple scripting method, the background and menus can be modified by the packager (content developer) to have a unique personalized look & feel.

In one embodiment, a method of aggregating multiple types of digital content (audio, music, image, video and text) into a single media object is provided. This allows a digital media device to display all the related content types under a single menu entry and allows the user to quickly move from one media type to another.

The basic concept is to create an enhanced version of a playlist. This 'media list' is cross linked to each of the content files to allow the media list to be quickly accessed from any of the associated content files.

The media list can be either flat (having no internal structure), grouped (grouping the different media types together) or fully hierarchal (with multiple levels of grouping). The digital device reads the media list and extracts only the content information that it can render. This enhanced metadata is added to the media library of the device.

A further enhancement is to specify in the media list a default background and template for interacting with the media list and it's content. This allows the content developer to personalize the experience, without regard to the actual digital device that will render the content.

Figure 5Z:
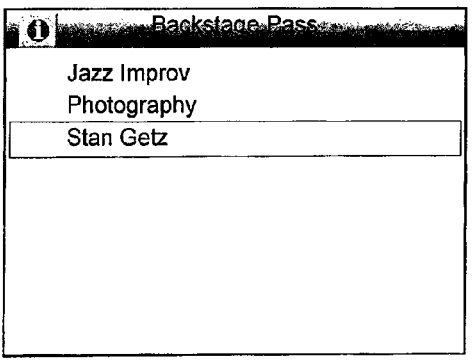
Figure 5A:
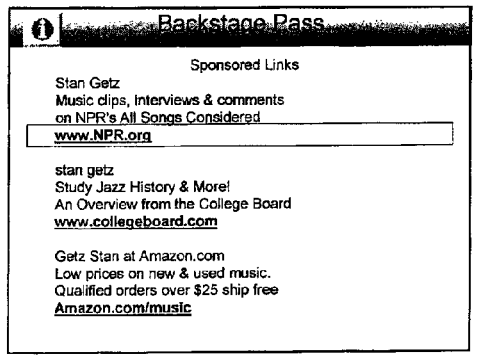
Figure 5B:
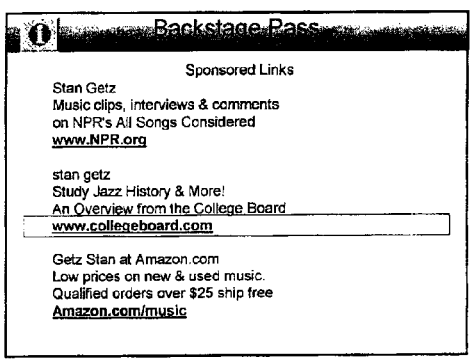
Figure 5C:
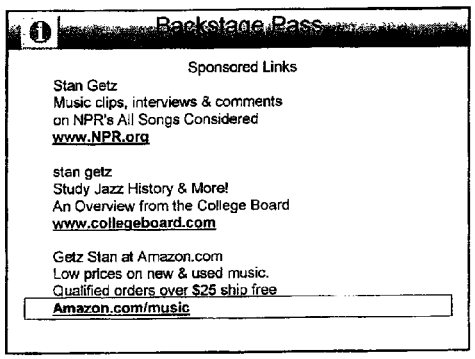
Figure 5D:
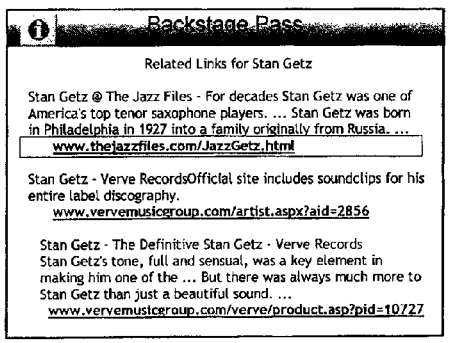
Figure 5E:
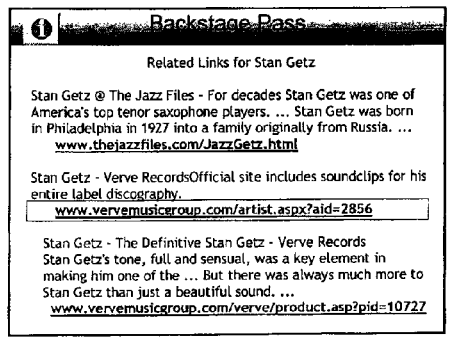
Figure 5F:
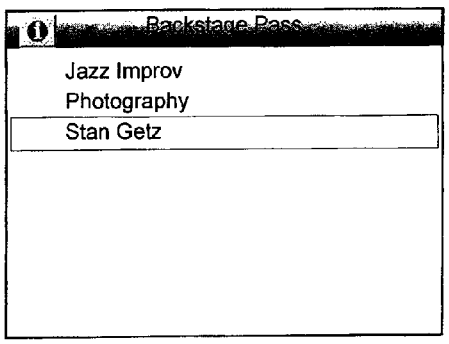
Figure 5G:
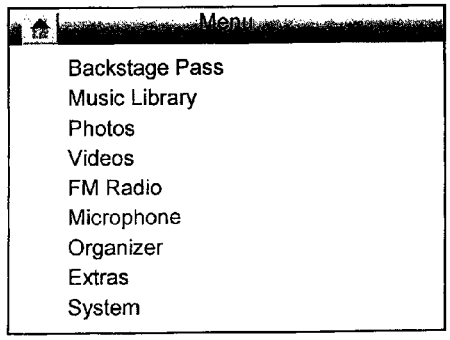
Figure 5H:
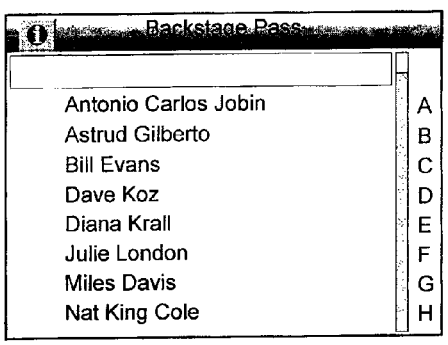
Figure 5I:
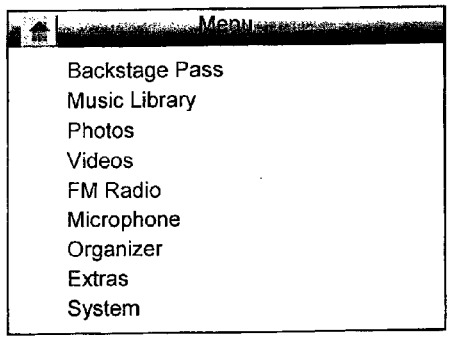
Figure 5J:
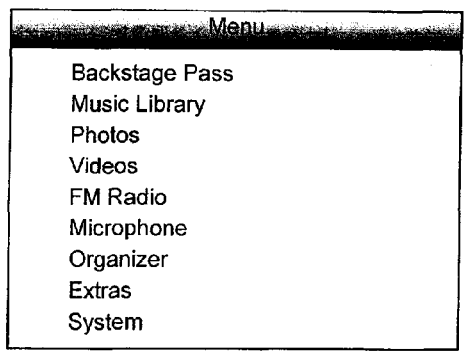
Figure 5K:
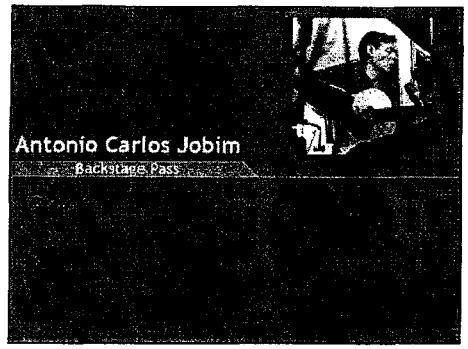
Figure 5L:
Figure 5M:
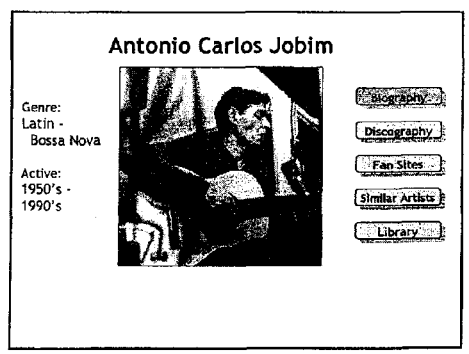

FIGS. 5A-5Z and 5AA-5MM show a sequence of display screens illustrating a media object file in accordance with one embodiment of the present invention and navigation to the links comprising the media object file. FIGS. 5A-5Z and 5AA-5MM comprises 7 pages, each page generally including 6 display screens, such as might appear on a portable media player (or host PC's) display screen when navigating to the linked files or locations described by the media object file. To clarify, in order to show the proper sequence, each page shows the sequence in order from left to right then proceeding downward.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for providing an audio message associated with a portable media player:
    receiving an event to provide the audio message, wherein the audio message is either a status message, a button interaction message, or a non-device operational message for the portable media player;
    determining a style for the audio message;
    determining a content for the audio message; and
    outputting the audio message with the determined style and content via an audio output of the portable media player,
    wherein determining the style for the audio message is based on selecting the style automatically,
    wherein the portable media player is configured to playback audio tracks and wherein selecting the style automatically comprises:
        analyzing a history of the audio tracks played back on the portable media player; and
        selecting the style based on the history.

2. The method as recited in claim 1, wherein the event is not tied to a button interaction between a user and the portable media player.

3. The method as recited in claim 1, wherein the event is tied to a button interaction between a user and the portable media player.

4. The method as recited in claim 1, wherein selecting the style automatically comprises selecting the style based on the audio tracks' metadata.

5. The method as recited in claim 1, wherein determining the content for the audio message is based on selecting the content automatically.

6. The method as recited in claim 1, further comprising:
juxtapositioning the audio message and audio tracks queued for playback on the portable media player.

7. The method as recited in claim 1, wherein the outputting of the audio message is performed in concert with a displaying of a corresponding text message, a corresponding splash screen, or a corresponding graphical image on a display of the portable media player.

8. The method as recited in claim 1, wherein the audio message is selected from a set of audio files.

9. The method as recited in claim 1, wherein the audio message is correlated with an audio track that is being rendered via the portable media player.

10. The method as recited in claim 9, wherein the audio message is a customized greeting from the artist of the audio track to the user.

11. The method as recited in claim 1, further comprising:
downloading a plurality of audio messages with specific themes and selecting one or more to be active at the same time for the audio message.

12. The method as recited in claim 11, further comprising:
exchanging one or more audio messages with specific themes between the portable media player and portable devices and/or host computers/devices.

13. The method as recited in claim 1, further comprising:
recording one or more audio messages directly on the portable media player in creating a personalized theme for the audio message.

14. The method as recited in claim 1, wherein determining the content for the audio message is based on selecting the content automatically, and wherein selecting the content automatically comprises:
selecting the content based on the analysis of the history of the audio tracks played back on the portable media player.

15. The method as recited in claim 1,
wherein the style and content for the audio message correspond to a particular theme.

16. The method of claim 15, wherein the particular theme for the style and content of the audio message is provided in user selectable audio file sets.

17. The method as recited in claim 1, wherein the style is selected from the group consisting of: energy level, personality, and type.

\* \* \* \* \*